United States Patent [19]

Linden

[11] Patent Number: 5,024,119
[45] Date of Patent: Jun. 18, 1991

[54] BICYCLE HANDLEBARS

[76] Inventor: Paul R. Linden, 221 Piedmont Rd., Columbus, Ohio 43214

[21] Appl. No.: 931,601

[22] Filed: Nov. 17, 1986

Related U.S. Application Data

[63] Continuation-in-part of Ser. No. 867,773, May 28, 1986, abandoned.

[51] Int. Cl.$^5$ .............................................. B62K 21/12
[52] U.S. Cl. .................................................. 74/551.1
[58] Field of Search ................. 74/551.1, 551.4, 551.6, 74/543; D12/178; 280/263

[56] References Cited

U.S. PATENT DOCUMENTS

| D. 26,340 | 11/1896 | Murphy . | |
|---|---|---|---|
| D. 28,081 | 12/1897 | Comstock | D12/178 |
| D. 28,297 | 2/1898 | Garden | D12/178 |
| D. 208,448 | 8/1967 | Fritz | D90/11 |
| D. 211,144 | 5/1968 | Pawsut | D12/178 |
| D. 215,987 | 11/1969 | Schreckengost | D12/178 |
| D. 216,655 | 2/1970 | Takashima | D90/11 |
| D. 217,525 | 5/1970 | Takashima | D90/8 |
| D. 263,293 | 3/1982 | Janson . | |
| 567,663 | 9/1896 | Snyder . | |
| 588,166 | 8/1897 | McCoy . | |
| 598,083 | 2/1898 | Gilbert . | |
| 1,476,347 | 12/1923 | Martin | 74/552 |
| 2,827,801 | 3/1958 | Ingolia . | |
| 4,445,396 | 5/1984 | Shimano | 74/551.1 |
| 4,503,729 | 3/1985 | Shimano | 74/551.1 |

FOREIGN PATENT DOCUMENTS

| 614303 | 4/1926 | France . | |
|---|---|---|---|
| 857732 | 7/1939 | France . | |
| 886661 | 10/1943 | France . | |
| 2476557 | 8/1981 | France . | |
| 430157 | 2/1948 | Italy | 74/551.1 |
| 21274 | of 1897 | United Kingdom | 74/551.1 |

OTHER PUBLICATIONS

"Murray Mark 3", American Bicyclist and Motorcyclist, Mar. 1970, p. 17.
R & J Products advertisement, undated.

*Primary Examiner*—Rodney M. Lindsey
*Attorney, Agent, or Firm*—Mueller and Smith

[57] ABSTRACT

Bicycle handlebars designed to convert a typical 10-speed or multiple speed bicycle from a racing posture configuration to a posture configuration more suited to touring and commuting. The handlebars include grip portions which are elevated and rearwardly disposed in comparison to racing-style dropped handlebars. The grip portions extend rearwardly from the supporting structure of the handlebars at an angle of about 45° with respect to the central axis of the bicycle. As such, the cyclist grips them in an anatomically natural posture. With this grip arrangement and the relative elevation and widthwise dimensioning of the handlebars, the cyclist assumes a posture eliminating compression of the cervical vertebrae and elongating the spinal column to an extent wherein the lumbar region becomes forwardly curved in a more natural posture resulting from a slight forward rotation of the pelvis.

15 Claims, 3 Drawing Sheets

BICYCLE HANDLEBARS

CROSS-REFERENCE TO RELATED APPLICATIONS

This application is a continuation-in-part of U.S. application Ser. No. 06/867,773, filed May 28, 1986, entitled "Bicycle Handlebars" now abandoned.

BACKGROUND OF THE INVENTION

Bicycle touring and commuting have become attractive outdoor activities to increasing numbers of amateur cyclists. These activities may involve trips ranging from a few to hundreds of miles and, thus, often require more than a modicum of physical stamina.

Bicycle enthusiasts customarily prefer cycle equipment which is of the multi-speed drive gear type, commonly referred to as "10-speed" or "3-speed". Those bicycles used for touring and most commonly for commuting are those having 10 to 15 speeds, and they find their design genesis in racing competition. Thus, they are lightweight and specially geared to achieve maximum speed for a given pedal pumping exertion by the rider or cyclist. To lower wind resistance, the traditional and essentially universal design of the bicycles will employ a category of racing-style "dropped" handlebars. While there are many variations in shape and dimensions for this form of handlebar, they include a downwardly rounded drop intended for track or road racing. Generally, to minimize air resistance, the racer stays down on the drops all the time so neither the height nor the shape of the top of the bars concerns the rider of a racing bike. Most of the drop handlebar designs are configured having a straight tubular portion which is connected with the neck of the head assembly of the bicycle which extends at either end into a gradual curved shape leading to the drops. To accommodate for touring and to aid in overcoming muscular fatigue induced by bending deeply on the drops, numbness caused by pressure on the nerves of the palm, and the discomfort caused by hitting bumps and chuck holes, the typical touring bicyclist will grasp the handlebars at locations near to the head assembly on the horizontal portion just before the brake hoods. This allows a somewhat more erect and comfortable posture for touring and commuting—activities in which minimization of air resistance and the fastest time are of less importance than endurance and comfort. No effort has been made by the industry to provide high performance touring or commuting handlebars or bicycle designs that deviate from the general track racing configuration, perhaps because of the infatuation of the bicycling public with the racing style. However, this infatuation occurs at the cost of substantial muscular fatigue, numbness, and general discomfort.

SUMMARY

The present invention is directed to an improved handlebar structure which may be employed with conventional multi-speed bicycles to achieve a bicycle design which considerably improves the kinesiological posture of the rider or cyclist. With the use of these handlebars, the spinal posture of the rider becomes one wherein the pelvis is slightly rotated forwardly, the lumbar region of the spine assumes a forwardly curving, naturally concave profile and the cervical vertebrae are not compressed. Additionally, the angular relationship between the pelvis and the leg is such as to improve the efficiency of pedal drive. The handlebars so position the hands of the rider that they assume an anatomically natural angular orientation with respect to the body plane and, particularly with respect to the shoulder girdle. As such, tensional strain otherwise required for other hand positions is minimized to a maximum extent. The elevation and location of the grip portions of the handlebars are such as to promote an ideal lateral spaced relationship of the hands and arms of the rider with respect to the lateral spacing of the shoulders, as well as an idealized angular relationship between the arms and the plane of the body. The balanced relation between seat height and hand grips height is such as to achieve more comfortable seating and less pressure on the hands, alleviating compression and possible numbness in both areas. In effect, an alteration is made such that a bicycle is evolved which is ideal from an anatomical and a kinesiological standpoint for touring and commuting purposes. This is achieved with minimal expense otherwise occasioned by altering the general design of the multi-speed bicycle.

Another feature and aspect of the invention is to provide handlebars for attachment to a bicycle of a variety having a front portion including a head assembly and a seat at given elevation rearwardly disposed therefrom and aligned therewith on a central axis of the bicycle for supporting a cyclist from beneath the pelvic region. The handlebars include a support portion rigidly connectable with the head assembly. Right- and left-hand grip portions are provided, each having a grip axis extending substantially in a common plane from respective right and left ends of the grip portions, the right and left grip portions being mutually laterally spaced in substantial correspondence with the widthwise interior spacing of the shoulders of the cyclist and are supported by the support portion. The support positions each of the grip portions to locate the right and left ends in spaced mutual adjacency and above the head assembly. The right- and left-hand grip portions extend rearwardly outwardly from the respective right and left ends to normally provide an angular orientation of each grip axis of about 45° with respect to the central axis so as to be hand grippable by the cyclist in a manner generating minimal arm muscular tension. The right and left grip portions are positioned by the support portion of the handlebars along the central axis at a predetermined distance from the seat and at an elevation with respect to the seat elevation selected to cause the cyclist to lean slightly forwardly to an extent effecting a forward rotation of the pelvic region while maintaining a posture effecting an elongation of the spinal column with a forward, naturally concave curving of the lumbar region thereof.

Another feature of the invention is to provide a bicycle which includes a frame having a centrally disposed axis and including a forwardly disposed head assembly having a handlebar clamp. A seat is provided which is mounted upon the frame at a given elevation for supporting the cyclist from below the pelvic region and a handlebar support is connectable with the handlebar clamp. Right- and left-hand grips are provided including respective right and left ends, the grips having mid positions mutually laterally spaced in substantial correspondence with the widthwise spacing of the inward regions of the shoulders of the cyclist. The grips are supported by the handlebar support for positioning each to locate the right- and left-hand grip respective right and left ends in spaced mutual adjacency and above the head assembly and handlebar support, the right- and left-hand grips normally extending rearwardly outwardly from respective right and left ends at an angle of about 45° with respect to the centrally disposed axis to be hand grippable by the cyclist in a manner generating minimized muscular tension and canted downwardly from horizontal a predetermined extent selected to promote the perpendicularity of the arms of the cyclist to the body plane thereof. The left and right grips position the handlebar support a predetermined distance from the seat and at an elevation with respect to the seat elevation selected to cause the cyclist to lean slightly forwardly to an extent effecting forward rotation of the pelvic region while maintaining a posture effecting an expansion of the spinal column with a forward, naturally concave curving of the lumbar region.

Other objects of the invention will, in part, be obvious and will, in part, appear hereinafter.

The invention, accordingly, comprises the apparatus possessing the construction, combination of elements and arrangement of parts which are expemplified in the following detailed disclosure. For a fuller understanding of the nature and objects of the invention, reference should be had to the following detailed description taken in connection with the accompanying drawings.

DETAILED DESCRIPTION OF THE INVENTION

While an appreciation of the merits of the handlebars of the instant invention can best be appreciated by their use in the course of a tour, an understanding as to why they improve the quality of bicycle touring with multiple speed bicycles requires a review of the universally popular multi-speed bicycle and the kinesiology of the cyclist who is riding it. Thus, referring to FIG. 1, a typical "10-speed" bicycle is shown generally at 10 which is configured having a triangular shape frame represented generally at 12 which includes a top tube 14, a down tube 16 and a bottom tube 18. Top tube 14 and bottom tube 18 are joined at a headset 20 which supports all of the components for steering the bicycle 10. For example, the oppositely disposed tines of a fork 22 are supported from a headset 20 and extend to a hub 24 which serves to rotatably support a front wheel 26. Correspondingly, the rear wheel 28 is mounted upon a structure which includes two rear stays, one of which is shown at 30, which extend to either side of rear wheel 28, as well as corresponding bottom stays, one of which is represented at 32. The wheel 28 is driven through a multiple geared arrangement, selection of which gearing ratios is provided by a derailleur represented at 34 which cooperates with a drive chain 36, in turn driven from the sprocket-crank-pedal assembly represented generally at 38. Some multi-speed bicycle structures will be seen to employ internal hub gear changes.

Mounted forwardly along the centrally disposed axis of the bicycle 10 and into the headset 20 are handlebars represented generally at 40. Illustrated as dropped style, the handlebars 40 are formed having two rearwardly curved drops for the right and left hand which are represented respectively in FIGS. 2 and 3 at 42 and 43. Usually, foam grips or the like will be located over these drops to improve the cyclist's grip. The latter figures show that a typical headset 20 also will include a forwardly protruding neck 44 having a clamp 46 supported at its forwardmost end. This clamp 46 serves to retain the straight center tube portion 48 of the handlebars 40. Disposed rearwardly from the handlebars 40 along the central axis of the bicycle 10 is a seat or saddle 50 (FIG. 1), the height or elevation of which is adjustable. Correspondingly, in typically encountered headset/stem/handlebar installations, the amount of elevational adjustment of handlebars 40 is quite limited.

Figure 1:
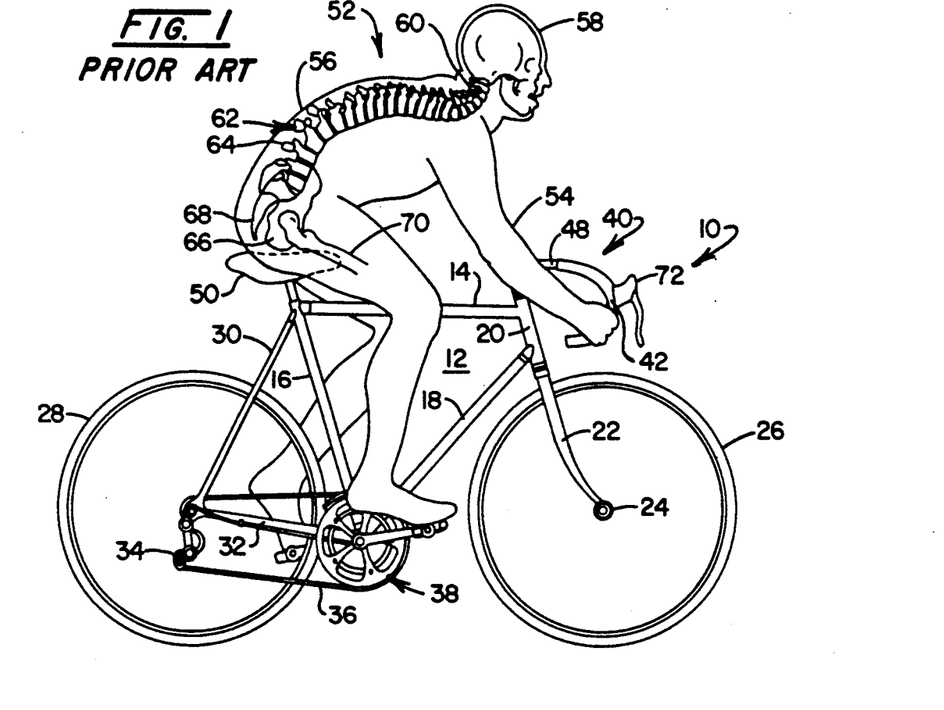
FIG. 1 is a side view of a multi-geared bicycle having dropped handlebars and showing a cyclist in a posture riding the bicycle with a grip on the drop portions of the handlebar, the cyclist's profile being broken away to reveal pelvic and spinal regions.

FIG. 1 shows an anatomically accurate profile of a cyclist or rider generally at 52 seated upon the bicycle 10 in a posture considered proper for cycling utilizing the bicycle 10 with dropped style handlebars 40. In this posture, the cyclist 52 is leaning forward such that his arms 54 and 55 extend down to permit grasping the respective right and left drops 42 and 43 of handlebars 40. In order to so grasp the drops 42 and 43, the cyclist 52 is seen to round his lower back 56 outwardly into a C-shape. This outwardly rounded shape of the back region is one wherein the head 58 would naturally be looking downward, as for example in the fetal position. However, in order for the cyclist to see where he is heading, his head must be cocked upwardly. In this position, the chest is caved in and the neck is pulled down and back to evoke a posture which inhibits the breathing and places strain on the neck. For example, any extra mobility which the cyclist needs, particularly in lifting the head up to see is achieved by rolling the pelvis backwardly so that it is more horizontal. FIG. 1 has been drawn showing the backbone and pelvis with anatomic correctness for the posture represented. Thus, it may be noted that the cervical vertebrae of the backbone 62 are in compression and the lumbar region of the backbone at 64 is curved outwardly. This is the most common posture on the bicycle. Another less common example of a stressful posture, of a different type, is provided in FIG. 3. Looking momentarily to that figure, the bicyclist is shown to be supporting his torso by allowing the back to sag into a flatter position (than that of FIG. 2) by allowing the upper torso to hand on the shoulder blades, thereby straining the neck and shoulder girdles and lower back. The head still must be cocked upwardly thereby compressing the cervical vertebrae.

Figure 2:
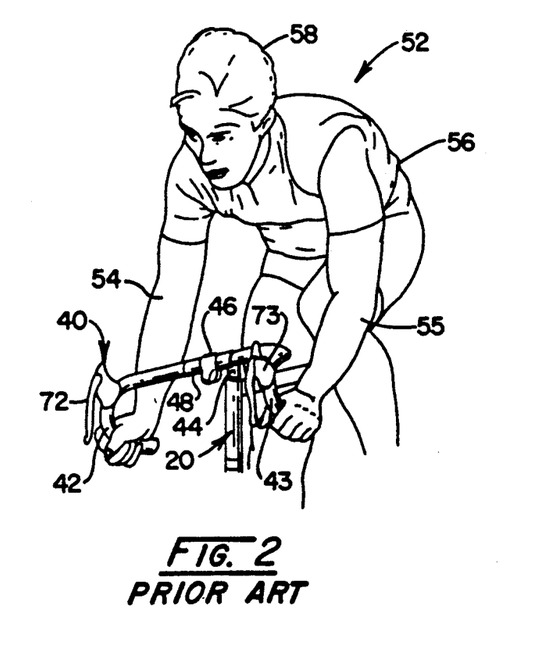
FIG. 2 is a pictorial representation of the rider and bicycle of FIG. 1 looking from the frontal left side portion of the bicycle, the dropped handlebars being shown as gripped by the cyclist.

Seat 50 supports the pelvic region of the cyclist 52 and in the postures of FIGS. 1-2, it may be observed that the pelvis 66 is in a substantially horizontal orientation. Alternately, should the pelvis be considered to have something of a bowl shape, then the bowl would be considered to be horizontally positioned upon the seat 50. Note additionally, that the coxis 68 at the lower end of the backbone 62 is rotated downwardly in a counterclockwise direction.

Generally, the elevation or height of the seat 50 is adjusted with respect to the length of the legs of the cyclist as they extend from the foot to the pedals of the sprocket-crank pedal assembly 38. In this regard, the height of the seat is set such that when a pedal is pushed to its downmost extension of its rotational locus of travel, there is a slight bend in the leg as the cyclist sits upon seat 50. Bending the legs constitutes a wind-up for the action of straightening the legs to push the pedals. When, early in the stroke, the leg is more bent, the muscles have better leverage and function more efficiently, and therefore, a riding position which allows more acute angles at the hip and knee will be more efficient. In addition, the more acute the angles at the hip and knee, the greater the distance the bones will be able to travel while the leg is straightened out; and the greater the distance over which the leg is accelerated, the more power will be delivered to the pedal. It is important to note that the visible angle between the leg as seen at femur 70 and the torso of the rider or cyclist 52 is not the functional element for powering the bicycle. The functional element important for this powering is the angle between the upper leg or femur and the pelvis. When the spine or backbone 62 is rounded outwardly or back as in FIGS. 1-3, the pelvis 66 is rolled back and there is a larger angle between the leg or femur 70 and the hip joint than would be apparent looking at the smaller angle between the torso as a whole and the leg.

Figure 3:
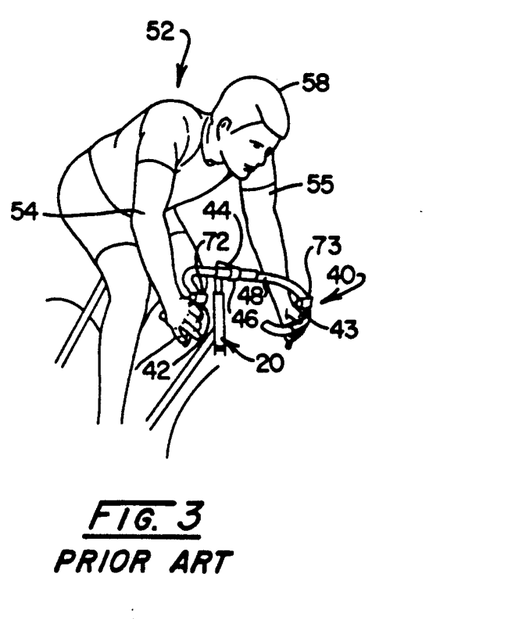
FIG. 3 is another pictorial representation of another rider of the bicycle of FIG. 1 taken from a forward right position showing the cyclist and dropped style handlebars.

For commuting, touring or recreational bicycling, the postures shown in FIGS. 1-3 are those inducing considerable muscle strain tension and thus, discomfort. The compression of the cervical vertebrae leads to muscular strain and neckaches and a considerable amount of the vibration from riding is transferred through the grips along the arms 54-55 and into the body of the rider 52. Considering that grip further, two other positions are considered appropriate for holding onto the drop style handlebars 40. In this regard, the cyclist often will grasp the center tube portion 48 (FIGS. 2, 3) or will grasp the forwardly and downwardly directed outer portions of the tube 48 just in front of the protective hood of the handlebar mounted brake levers as at 72 and 73. When the hands of the rider 52 are so positioned upon the center tube 48 of the handlebars 40, the arms are drawn inwardly and the palms of the hand are essentially horizontal. With the hands gripping the tops the bicycle rider is raised up and away from the front wheel, and though the effects of the bent posture are thereby lessened, the posture is still bent over enough to have significant negative results. Ordinarily, on the tops of the drop style bars, the brake levers are inaccessible. For easy access, a secondary brake lever parallel to the tops sometimes is used, but it is dangerous in that it provides much less powerful braking. With the hands on the brake hoods, the levers are accessible, but the position is awkward and creates a weak grip. Only on the drops is the brake lever both accessible and capable of being squeezed strongly.

Figure 6:
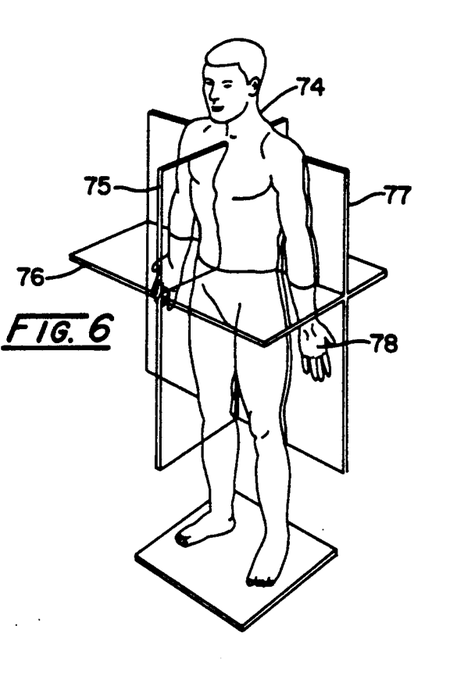
FIG. 6 is a representation of an anatomic position of the human body (anterior view, palms forward) showing reference systems.

The natural posture of the arms, for example when standing with the arms hanging loosely from the shoulders, is one wherein the palms assume about a 45° orientation with respect to the body plane defined by a line from shoulder to shoulder. (This would not be true in cases where there are deviations from the anatomically optimal alignment of the ribs, sternum, spinal column, and shoulder girdle.) Thus, the palms or thumbs lie within a plane which intersects at about a 90° angle and not in the unnatural postures often depicted in anatomical studies as shown at 78 in FIG. 6. When the palms are held horizontally as in grasping the center tube 48, muscular tension is required to retain that unnatural posture. This muscular tension tends to build fatigue in the course of touring. On the other hand, as the grip moves toward the brakes 72-73 or down to the drops 42-43, then the palm of the hand becomes vertically oriented and, again, muscular tension is required to retain this position. Where this muscular tension is combined with the strain imposed by bicycle riding, fatigue again builds, particularly over long distances. To achieve the cycling posture wherein this strain is not encountered, the hands must grasp the handlebars at about a 45° angle with respect to the central axis of the bicycle. There is no way this can be accomplished with the drop style handlebars as illustrated at 40. Where multi-speed but heavy duty bikes, such as 3-speed or all terrain bikes having relatively straight handlebars are employed, the hands are held further apart than shoulder width and the adductor muscles have to perform work or go into tension pulling the arms inwardly to hold them in position. In consequence, the muscles are called upon to provide weight and impact support as opposed to the bones. Note that the arms extend from the shoulder girdle which is, in effect, a shallow joint at the head of the humerus of the upper arm. This complex anatomical structure is anatomically coupled in various degrees with the shoulder blade and clavicle such that the imposition of muscular tension through the arm and into the union will develop a broad range of fatigue aspects over a relatively extended portion of the torso. Thus, considering the kinesiology and the biomechanics of the cyclist 52, for touring purposes, the cyclist has been caused to assume an unnatural position.

Turning again to FIG. 6, a typical anatomic position of the body (anterior view, palms forward) is presented with conventional reference planes. In this regard, note that the body structure 74 is shown interpreted with respect to a mid-sagittal plane 75, a transverse plane 76 and a coronal plane 77. For the instant discussion a more convenient term for the latter plane 77 as it references the region above the transverse plane is the "body plane". See S. Jacob, C. Francone, "Structure and Function of Man", 3d Edition, W. B. Saunders Company, Philadelphia, Pa., 1974.

As still another aspect of improvement of the performance of the cyclist 52 with respect to the bike 10, it may be noted that in the posture associated with the rider grasping the drops 42 and 43, the arms 54-55 are extended somewhat upwardly with respect to the body plane. Here again, an inefficiency in force transfer is occasioned. Ideally, the arms should be located nominally perpendicularly to the body plane. Illustration of the efficiencies achieved with this may be considered in conjunction with the common push-up. Where the hands are straightforward from the body plane or perpendicular thereto as the body rests on the floor, then the exertion in pushing up is more efficiently carried out as opposed to the hand being forward (that is, closer to the head) of the shoulders. A common way in which during bicycle riding the upper arm is brought more into the mid-sagittal plane perpendicular to the torso is to bend the elbows. However, this increases the load upon the extensor muscles behind the arm since the bones of the upper and lower arm no longer form a continuous support member, and the extensor muscles must work to keep the arm stable. In addition, this posture deepens the forward bend and exacerbates the negative effects of the common ten speed postures.

Figure 4:
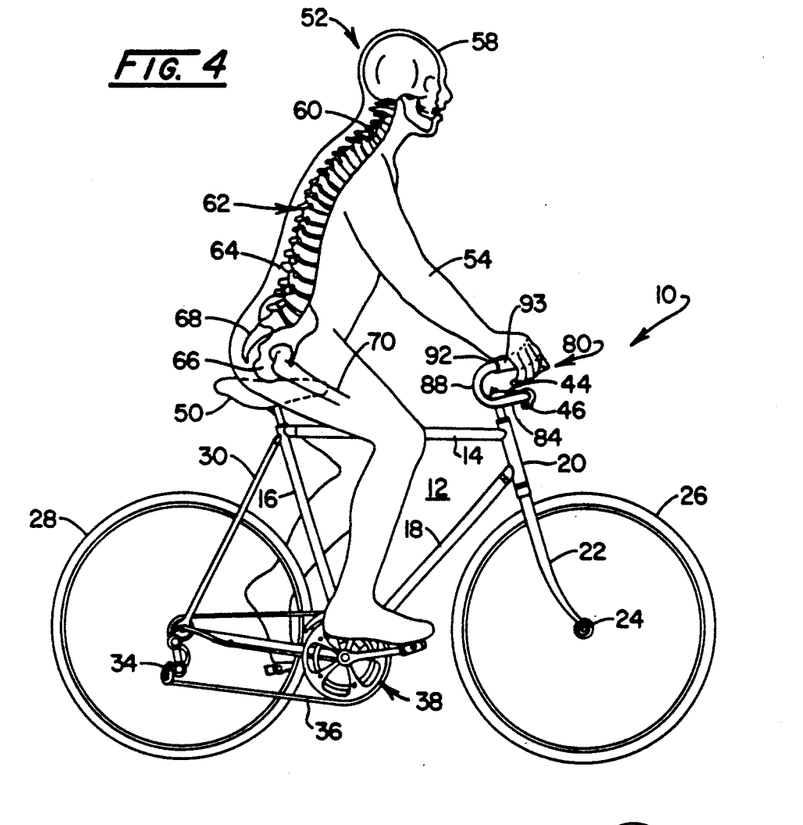
FIG. 4 is a side view corresponding with FIG. 1 but showing a change in posture developed with the bicycle and handlebars of the invention.

Referring to FIG. 4, the bicycle and handlebars of the invention are drawn in a manner wherein the figure may be compared with FIG. 1, common components of both bicycle and the cyclist 52 being reproduced. Additionally, the anatomical features of the cyclist as shown in break-away fashion are identically reproduced in correspondingly scaled fashion such that comparisons may be made. In FIG. 4, the bicycle 10 is essentially identical with that shown in FIG. 1, with the exception of the handlebars and the brake levers which are represented in general at 80. In all figures herein, the handlebars as at 40 or 80 are oriented such that the front wheel 26 is aimed straight ahead and in alignment with the central axis of bicycle 10. This is herein termed a "normal" orientation.

Figure 7:
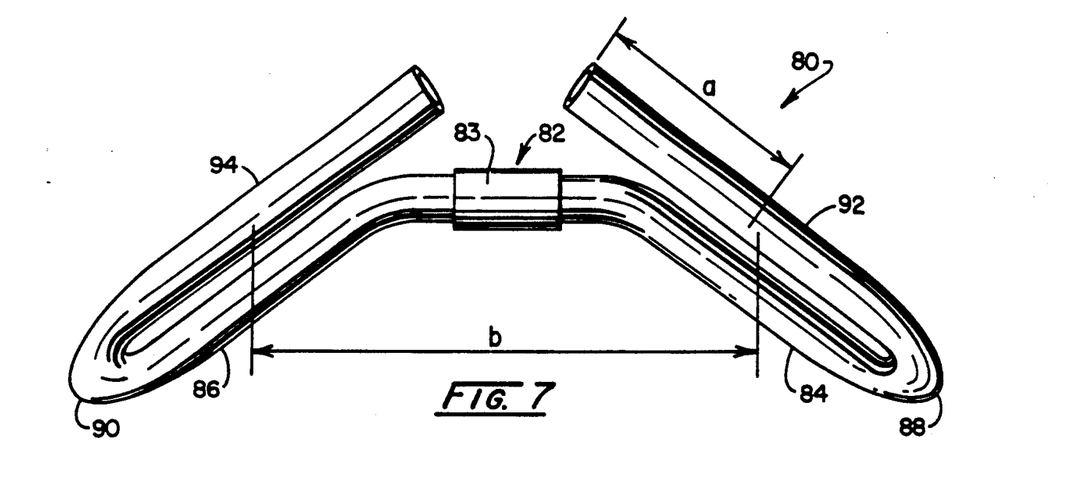
FIG. 7 is a top view of the handlebars shown in FIGS. 4 and 5.
Figure 8:
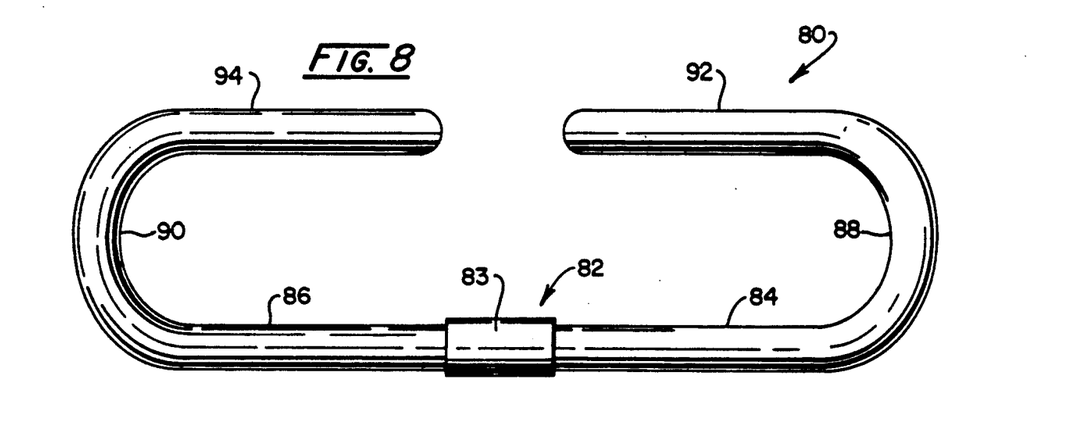
FIG. 8 is a rear view of the handlebars of FIG. 7.
Figure 9:
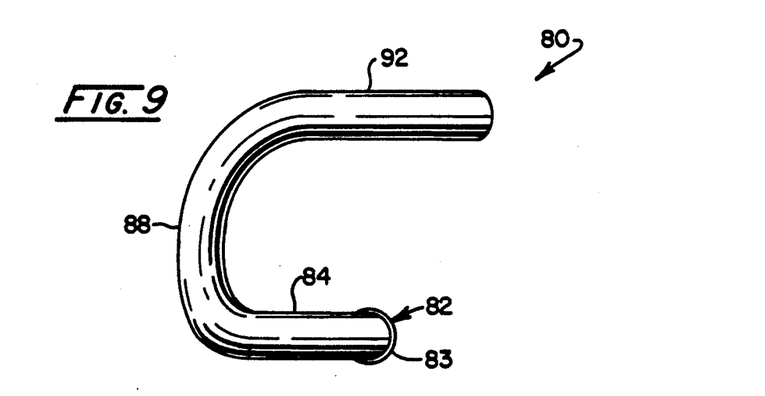
FIG. 9 is a side view of the handlebars of FIGS. 7 and 8.

Looking additionally to FIGS. 7-9, the handlebars 80 are seen to be formed of tubular stock and are coupled to the clamp 46 of the forwardly extending neck 44 of headset 20 at a straight and horizontally disposed connector portion 82. The connector portion 82 may be considered to have a connector axis 81 along its lengthwise extent and includes a centrally disposed collar 83 which may be welded in place and serves to provide a slightly enlarged diameter for engagement by clamp 46. This facilitates the mounting of the handlebars. Portion 82 extends on both the right- and the left-hand sides to form respective right- and left-hand side lower rearward extension portions 84 and 86 which are coplanar with connector portion 82 and may be considered to have extension axes shown respectively at 85 and 87 along their lengthwise extents. It may be observed that the extension axes 85 and 87 of these lower rearward extensions 84 and 86 extend with respect to the connector axis 81 of connector portion 82 at about a 45° angle. At the terminus of the extent of the lower rearward extension portions 84 and 86, the handlebars 80 then transition into an upwardly curved elevating portion shown, respectively, at 88 and 90. These respective right and left elevating portions 88 and 90 then extend into respective right and left tubular grips 92 and 94. Grips 92 and 94 extend towards each other, terminating at respective ends 93 and 95 which are spaced in mutual adjacency and are located above the headset 20 (FIG. 4). The respective axes 97 and 99 of grips 92 and 94 reside in a common plane as do extension axes 85 and 87. Further, axis 97 may be seen to be parallel to axis 85, while axis 99 is parallel with axis 87. Grip ends 93 and 95 are located in mutual adjacency, and are positioned above connector portion 82, as well as above the head assembly 20. When the bicycle 10 is in a normal orientation, the grips 92 and 94 and their respective axes 97 and 99 extend from respective ends 93 and 95 rearwardly outwardly at angles of about 45° with respect to the bicycle 10 central axis.

Figure 5:
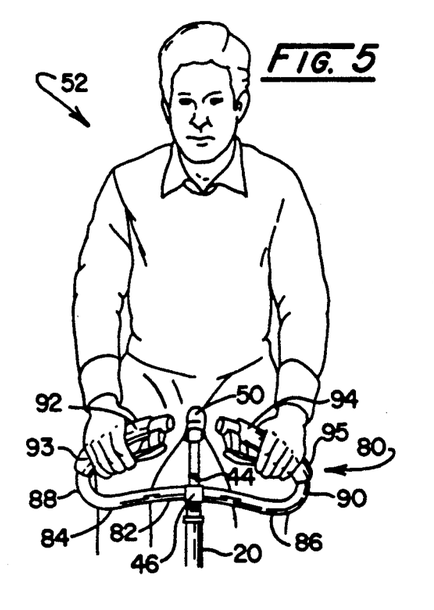
FIG. 5 is a front view of the bicycle and rider of FIG. 4 showing the handlebars of the invention and the rider's posture in gripping them and the brake levers.

FIG. 4 additionally reveals that the bicycle 10, with the handlebars 80 attached at clamp 46, provides that the grips 92 and 94 including respective foam pads 98 and 100, are at a slight angle with respect to horizontal. In this regard, FIG. 4 reveals that the connection between the connector portion 82 and clamp 46 is such that the lower rearward extensions as at 84 and 86 are downwardly canted to so correspondingly downwardly cant the grips. This is selected to promote a perpendicularity between the axis of the extended arm 54 and the body plane of the cyclist 42. FIG. 5 shows that when the bicyclist grasps the grips 92 and 94 his hands are in a natural 45° cant with respect to the central axis of the bicycle. Thus, the hands are in an anatomically natural half-turn placement which minimizes muscular tension. This minimization of muscular tension also is enhanced by the lateral spacing of the hands of the rider 52 as he grasps the grips 92 and 94. This lateral spacing of the grip portions is such that the arms of the rider 52 essentially extend forwardly from the shoulder girdle without excessive deviation inwardly or outwardly. This further assists in minimizing strains induced through the complex shoulder girdle region and portions of the torso associated therewith.

Now looking again to FIG. 4, it may be observed that the elevating portions 88 and 90 will be seen to position the grips 92 and 94 above the elevational height of the seat 50. However, the elevating portions 88 and 90 of the handlebars 80 serve to bring the torso of the cyclist upwardly but not so far as to cause him to sit vertically upward. When the body is vertical, i.e., the long axis of the torso or body plane is perpendicular to the top tube 14, shocks are directly transmitted along the line of vertebrae thereby stressing the vertebrae and discs. There is a slight forward cant to the torso which is selected such that the shock absorbing capabilities of the spinal column curves may be employed as the bicycle 10 is ridden over bumps and the like. In addition to being elevated, the lower rearward extensions 84 and 86 also aid in positioning the grip portions 92 and 94 such that the arms achieve a more ideal perpendicular orientation with respect to the body plane of the cyclist 52. Of particular note, it may be observed that when the cyclist is in the position imposed by the handlebars 80, the cervical vertebrae at 60 are not compressed as the head looks forward in a natural posture. Importantly, note that the lumbar region 64 of the back is not bowed outwardly but assumes a forward, naturally concave curving orientation. Further, the entire backbone 62 displays an elongation of the spinal column. This posture may be observed to have caused the pelvis 66 to have rotated forwardly and that the coxis 68 also has been rotated. In effect, an entirely different anatomical posture is achieved which will avoid back strain. Additionally, however, a comparison with FIG. 1 will reveal that when the pelvis 66 is so rotated forwardly, there is a smaller angle between that pelvis and the leg as represented by the femur 70. This results in increased efficiency in the use of the leg.

Another advantage accrues with the handlebar 80 design of the invention with respect to the earlier-noted poor positioning of the hands of the touring cyclist when engaging the brake levers under conditions where the cyclists hands are on the horizontal top bar. With the handlebars 80, the brake levers are quite accessible, in an overall comfortable body posture and with a specific manner of use of the hand that provides for quick and powerful braking action. This relationship of the hands to the braking lever is illustrated in FIG. 5. Note that the grips 92 and 94 are of sufficient lengthwise extent to accommodate the mounting of the brake levers adjacent respective ends 93 and 95. Considering additional aspects of safety, the erect position and freedom of movement of the neck of the cyclist provides for better vision of the road and traffic which may be encountered.

Returning to FIG. 7, dimensions which have been found to be somewhat universally ideal for the structure of the handlebars 80 are represented. In this regard, the mid point of the palm as it grasps the grips as at 92 and 94 is shown as being positioned a distance "a" from the end of the grip 92. Preferably, this distance has been established as about 4½ inches. Correspondingly, to achieve the proper spacing of the hands with respect to the shoulder girdle, the spacing between these midpoint locations of the palm on grips 92 and 94 as represented by the dimension "b", preferably is about 11½ inches.

The handlebars 80 are structured as represented in FIGS. 7-9 such that they can be utilized to modify any multi-speed bicycle 10 having drop handlebars 40 at very moderate expense. This transforms the bicycle from one which is uncomfortable and ill-suited for touring to a vehicle which is much less prone to impose strain and body fatigue.

While the instant discourse has looked to the use of the handlebars 80 in conjunction with typical "10 speed" two-wheeled bicycles, the handlebars will be seen to have utility for use in several related applications. For example, the handlebars will be seen to have utility in replacing the relatively straight handlebars used with 3 speed bicycles. In addition, the handlebars 80 are ideally employed with exercise bicycles which may be structured without wheels. Similarly, the handlebars will have application to tricycle structures. Accordingly, as used herein, the term "bicycle" is meant to include those pedal-driving machines which employ three components, namely, two pedals, handlebars, and a saddle or seat.

Since certain changes may be made in the above-described apparatus without departing from the scope of the invention herein involved, it is intended that all matter contained in the description thereof or shown in the accompanying drawings shall be interpreted as illustrative and not in a limiting sense.

I claim:

1. Handlebars for attachment to a bicycle having a front portion including a head assembly and a seat at given elevation rearwardly disposed therefrom and aligned therewith along a central axis of said bicycle for supporting a cyclist from beneath the pelvic region, comprising:

a support portion rigidly connectable with said head assembly; and right- and left-hand grip portions for being gripped by the hands of said cyclist, each having a grip axis extending substantially in a common plane from respective right and left ends of said grip portions, said right and left grip portions being mutually laterally spaced in substantial correspondence with the widthwise interior spacing of the shoulders of said cyclist, supported by said support portion to position each to locate said right and left ends in spaced mutual adjacency and above said head assembly, said right- and left-hand grip portions extending rearwardly outwardly from respective said right and left ends to normally provide an angular orientation of each said grip axis of about 45° with respect to said central axis to be hand grippable by said cyclist in a manner generating minimal arm muscular tension, said left-hand and right-hand grip portions being positionable by said support portion along said axis a predetermined distance from said seat and at an elevation with respect to said seat elevation selected to cause said cyclist to lean slightly forwardly to an extent effecting forward rotation of said pelvic region while maintaining a posture effecting an elongation of the spinal column with a forward, naturally concave curving of the lumbar region.

2. The handlebars of claim 1 in which said right- and left-grip portions are configured having a lengthwise extent selected for effecting the mounting of hand actuated bicycle brake levers for pivoting from a location, adjacent respective said right and left ends.

3. The handlebars of claim 1 in which said support portion comprises:

centrally disposed tubular portion means having a given axis for connectively clamping said handlebar to said head assembly;

right- and left-lower rearward extension tubular portion means, integrally formed with said centrally disposed tubular portion means each having an extension axis and extending rearwardly and outwardly from said centrally disposed tubular portion means when said centrally disposed portion means is connected with said head assembly, each said extension axis being at an angle of about 45° with respect to said centrally disposed tubular portion means given axis; and right- and left-elevating tubular portion means, integrally formed with respective said right- and left-lower rearward extension tubular portion means and curved upwardly therefrom for supporting said right- and left-hand grip portions at elevations selected at least as high as said given elevation of said seat.

4. The handlebars of claim 3 in which said centrally disposed tubular portion means, said right- and left-lower extension tubular portion means, said right- and left-elevating tubular portion means, and said right- and left-hand grip portions are integrally formed of tubular stock.

5. The handlebars of claim 3 in which:

said extension axis of said right-lower rearward extension tubular portion means is substantially parallel with said grip axis of said right-hand grip portion;

said extension axis of said left-lower rearward extension tubular portion means is substantially parallel with said grip axis of said left-hand grip portion; and said centrally disposed tubular portion means, said right- and left-lower extension tubular portion means, said right- and left-elevating tubular portion means, and said right- and left-hand grip portions are integrally formed of tubular stock.

6. A bicycle comprising:

a frame having a centrally disposed axis and including a forwardly disposed head assembly supporting a handlebar clamp;

a seat mounted upon said frame at a given elevation for supporting a cyclist from below the pelvic region;

handlebar support means for connection with said handlebar clamp;

right- and left-hand grip means for gripping by said cyclist including respective right and left ends and having mid positions mutually laterally spaced in substantial correspondence with the widthwise spacing of the inward regions of the shoulders of said cyclist, supported by said handlebar support means for positioning each to locate said right-and left-hand grip means respective right and left ends in spaced mutual adjacency and above said head assembly and handlebar support means, said right- and left-hand grip means normally extending rearwardly outwardly from respective said right and left ends at an angle of about 45° with respect to said centrally disposed axis to be hand grippable by said cyclist in a manner generating minimized muscular tension and canted downwardly from horizontal a predetermined extent selected to promote the perpendicularity of the arms of said cyclist to the body plane thereof, said left- and right-hand grip means being positionable by said support means a predetermined distance from said seat and at an elevation with respect to said seat elevation selected to cause said cyclist to lean slightly forwardly to an extent effecting forward rotation of said pelvic region while maintaining a posture effecting an expansion of the spinal column with a forward, naturally concave curving of the lumbar region.

7. The bicycle of claim 6 in which said support means provides said lateral spacing of said right- and left-hand grip means of about 11 to 12 inches at the said mid positions thereof.

8. The bicycle of claim 6 including hand actuated bicycle brake lever means mounted upon said right and left grip means for pivoting from positions adjacent respective said right and left ends for hand braking said bicycle.

9. The bicycle of claim 6 in which said handlebar support means comprises:

centrally disposed tubular portion means having a given axis for connectably clamping to said handlebar clamp;

right- and left-lower rearward extension tubular portion means, integrally formed with said centrally disposed tubular portion means each having an extension axis and extending rearwardly and outwardly from said centrally disposed tubular portion means, each said extension axis being at an angle of about 45° with respect to said centrally disposed tubular portion means given axis; and right- and left-elevating tubular portion means, integrally formed with respective said right- and left-lower rearward extension tubular portion means and curved upwardly therefrom for supporting said right- and left-hand grip portion means at elevations selected at least as high as said given elevation of said seat.

10. The bicycle of claim 9 in which said centrally disposed tubular portion means, said right- and left-lower extension tubular portion means, said elevating tubular portion means, and said right- and left-hand grip portion means are integrally formed of tubular stock.

11. The bicycle of claim 9 in which:

said extension axis of said right-lower rearward extension tubular portion means is substantially parallel with said grip axis of said right-hand grip portion;

said extension axis of said left-lower rearward extension tubular portion means is substantially parallel with said grip axis of said left-hand grip portion; and said centrally disposed tubular portion means, said right- and left-lower extension tubular portion means, said right- and left-elevating tubular portion means, and said right- and left-hand grip portions are integrally formed of tubular stock.

12. Handlebars for attachment to a bicycle having a frame with a centrally disposed frame axis including a forwardly disposed head assembly having a handlebar clamp, and a seat mounted upon said frame at a given elevation for supporting a cyclist from below the pelvic region, comprising:

a central connector portion connectable with said handlebar clamp and having a connector axis;

right- and left-rearward extension portions integrally formed with said connector portion, each having an extension axis and each normally extending rearwardly outwardly with respect to said frame axis and at an angle of about 45° with respect to said connector axis;

right- and left-elevating portions integrally formed with respective said right- and left-rearward extension portions, each extending upwardly therefrom; and right- and left-hand grip portions having respective right- and left-grip axes extending forwardly substantially within a common plane and substantially parallel with respective said right- and left-rearward extension portion extension axes to respective right and left ends located in substantial mutual adjacency;

said right- and left-hand grip portions having mid portions mutually laterally spaced in substantial correspondence with the widthwise spacing of the inward regions of the shoulders of said cyclist and being hand grippable by said cyclist in a manner generating minimal arm muscular tension, said right- and left-hand grip portions being positionable a predetermined distance from said seat and at an elevation with respect to said seat given elevation selected to cause said cyclist to lean slightly forwardly to an extent effecting forward rotation of said pelvic region while maintaining a posture effecting an elongation of the spinal column with a forward, naturally concave curving of the lumbar region.

13. The handlebars of claim 12 in which said lateral spacing of said right- and left-hand grip portion mid positions is about 11 to 12 inches.

14. The handlebars of claim 12 in which said central portion, said right- and left-rearward extension portions, said right- and left-elevating portions and said right and left hand grip portions are integrally formed of tubular stock.

15. Handlebars for attachment to a bicycle having a frame with a centrally-disposed frame axis including a forwardly disposed head assembly having a handlebar clamp and a seat mounted upon said frame at a given elevation for supporting a cyclist from below the pelvic region, comprising:

handlebar support means for connection with said handlebar clamp;

right- and left-hand grip means for gripping by said cyclist including respective right and left ends and having mid positions mutually laterally spaced in substantial correspondence with the widthwise spacing of the inward regions of the shoulders of said cyclist, supported by said handlebar support means to locate said right- and left-hand grip means respective right and left ends in spaced mutual adjacency and above said head assembly and handlebar support means, said right- and left-hand grip means normally extending rearwardly outwardly from respective said right- and left-ends at an angle of about 45° with respect to said centrally-disposed axis to be hand grippable by said cyclist in a manner generating minimized muscular tension and canted downwardly from horizontal a predetermined extent selected to promote the perpendicularity of the arms of said cyclist to the body plane thereof, said left and right grip means being positionable by said handlebar support means a predetermined distance from said seat and at an elevation with respect to said seat given elevation selected to cause said cyclist to lean slightly forwardly to an extent effecting the forward rotation of said pelvic region while maintaining a posture effecting an expansion of the spinal column with a forward, naturally curving of the lumbar region.

* * * * *